(12) United States Patent
Ryu et al.

(10) Patent No.: US 9,806,910 B2
(45) Date of Patent: Oct. 31, 2017

(54) GATEWAY DEVICE, VEHICLE INCLUDING THE SAME, AND CONTROL METHOD FOR THE SAME

(71) Applicant: Hyundai Motor Company, Seoul (KR)

(72) Inventors: Jungnan Ryu, Gyeonggi-do (KR); SungKwan Choo, Gyeonggi-do (KR); Joon Ho Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 106 days.

(21) Appl. No.: 14/918,925

(22) Filed: Oct. 21, 2015

(65) Prior Publication Data

US 2016/0381679 A1 Dec. 29, 2016

(30) Foreign Application Priority Data

Jun. 24, 2015 (KR) .................. 10-2015-0089909

(51) Int. Cl.
*H04W 4/00* (2009.01)
*H04L 12/66* (2006.01)
*H04B 1/3822* (2015.01)
*H04L 12/46* (2006.01)
*H04L 12/40* (2006.01)

(52) U.S. Cl.
CPC ........... *H04L 12/66* (2013.01); *H04B 1/3822* (2013.01); *H04L 12/4625* (2013.01); *H04L 2012/40215* (2013.01); *H04L 2012/40273* (2013.01)

(58) Field of Classification Search
CPC .................. H04B 1/3822; H04L 12/66; H04L 2012/40215
See application file for complete search history.

(56) References Cited

U.S. PATENT DOCUMENTS

2010/0161842 A1\* 6/2010 Shan ..................... G06F 1/3209
710/18
2015/0281022 A1\* 10/2015 Harata ................ H04L 12/2825
370/242

FOREIGN PATENT DOCUMENTS

| JP | 2011-066769 A | 3/2011 |
| KR | 10-0976710 B1 | 8/2010 |
| KR | 10-2012-0119890 A | 10/2012 |
| KR | 10-2014-0124255 A | 10/2014 |
| KR | 10-2015-0003543 A | 1/2015 |

(Continued)

OTHER PUBLICATIONS

Decision on Grant issed by the Korean Intellectual Property Office for Korean Patent Application No. 10-2015-0089909, dated Jun. 29, 2016, English Abstract, 9 pages.

*Primary Examiner* — Minh-Trang Nguyen
(74) *Attorney, Agent, or Firm* — Mintz Levin Cohn Ferris Glovsky and Popeo, P.C.; Peter F. Corless

(57) ABSTRACT

Disclosed herein is a gateway device including a communication interface provided with a plurality of channels capable of connecting to an external device; a switch unit configured to determine a connection state between the plurality of channels; and a controller configured to group a Controller Area Network (CAN) signal, which is received from a first external device connected to a first channel among the plurality of channels, into a message frame, and when an identifier of the message frame is included in a pre-determined high-speed transmission identifier group, configured to control the switch unit so that a second channel to which a second external device corresponding to the identifier is connected, is connected to the first channel.

23 Claims, 12 Drawing Sheets

(56) References Cited

FOREIGN PATENT DOCUMENTS

| KR | 10-1480389 B1 | 1/2015 |
| KR | 10-1491293 B1 | 2/2015 |
| KR | 10-1527779 B1 | 6/2015 |

* cited by examiner

FIG. 6A

STANDARD CAN

| S O F | 11-BIT IDENTIFIER | R T R | I D E | r0 | DLC | 0...8 BYTES DATA | CRC | ACK | E O F | I F S |

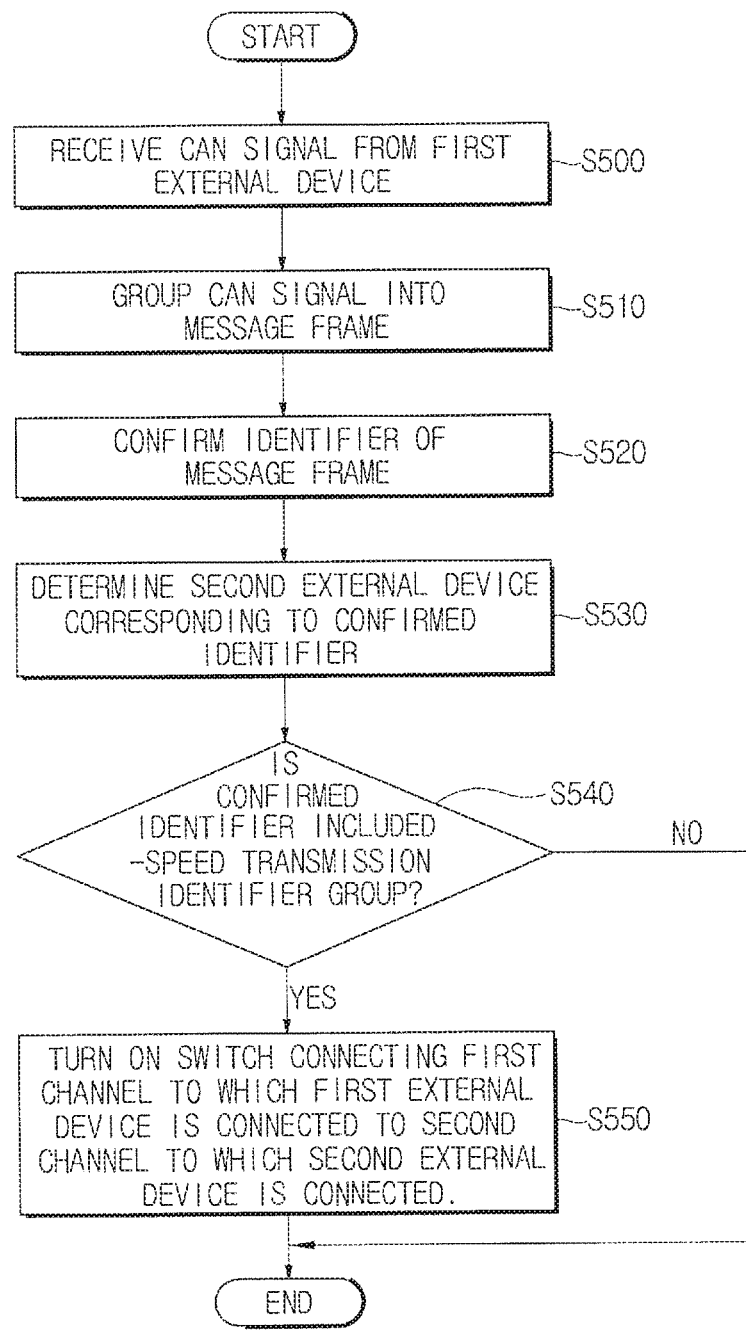

GATEWAY DEVICE, VEHICLE INCLUDING THE SAME, AND CONTROL METHOD FOR THE SAME

CROSS-REFERENCE TO RELATED APPLICATION

This application claims the benefit of and priority to Korean Patent Application No. 10-2015-0089909, filed on Jun. 24, 2015 in the Korean Intellectual Property Office, the disclosure of which is incorporated herein in its entirety by reference.

BACKGROUND

1. Technical Field

Embodiments of the present disclosure relate generally to a gateway device configured to route Controller Area Network (CAN) signal, a vehicle including the same and a control method of the same.

2. Description of Related Art

A variety of vehicle modules configured to perform a variety of functions may be provided in a vehicle. At the present time, each vehicle module may be implemented by an independent communication bus system, which is different from each other. Therefore, the vehicle may form a vehicle network by applying a Controller Area Network (CAN) communication protocol configured to connect the vehicle modules through a serial communication network.

As digitization of the vehicle has progressed, the number of vehicle modules connected to the vehicle network provided in the vehicle has increased. As a result, the number of Electronic Control Units (ECUs) connected to the network formed in the vehicle and the number of message frames sent to the ECU may be increased. Consequently, the load on the vehicle network increases, and it may be difficult to smoothly control the vehicle. Therefore, the vehicle may include a gateway device configured to relay exchanging message frames between a plurality of vehicle modules.

SUMMARY

Therefore, it is an aspect of the present disclosure to provide a gateway device capable of determining whether to perform high-speed transmission of message frame depending on a message frame identifier, a vehicle including the same, and a control method of the same. Additional aspects of the present disclosure will be set forth in part in the description which follows and, in part, will be apparent from the description, or may be learned by practice of the present disclosure.

In accordance with embodiments of the present disclosure, a gateway device includes: a communication interface provided with a plurality of channels capable of connecting to an external device; a switch unit configured to determine a connection state between the plurality of channels; and a controller configured to group a Controller Area Network (CAN) signal, which is received from a first external device connected to a first channel among the plurality of channels, into a message frame, and when an identifier of the message frame is included in a pre-determined high-speed transmission identifier group, configured to control the switch unit so that a second channel to which a second external device corresponding to the identifier is connected, is connected to the first channel.

The switch unit may include a switch provided between the first channel and the second channel, and the controller may be further configured to turn on the switch when the identifier of the message frame is included in the high-speed transmission identifier group.

The controller may be further configured to turn on the switch so that the CAN signal may be transmitted to the second external device from the first channel by directly passing the second channel.

The controller may be further configured to group a CAN signal received from the first external device into the message frame after turning on the switch, and may be configured to monitor the identifier of the message frame.

The controller may be further configured to turn off the switch when the identifier of the message frame is not included in the high-speed transmission identifier group.

The controller may be further configured to turn off the switch to prevent the CAN signal from being transmitted to the second external device from the first channel by directly passing the second channel.

The communication interface may include a first channel capable of connecting to the first external device including a diagnostic tool configured to diagnose the second external device.

The controller may be further configured to control the switch unit so that the first channel is connected to the second channel when the identifier of the message frame is included in a high-speed transmission identifier group including at least one identifier configured to diagnose the second external device.

Furthermore, in accordance with embodiments of the present disclosure, a vehicle includes: a plurality of vehicle modules configured to transmit/receive a CAN signal, and a gateway device connected to the plurality of vehicle modules, and configured to transmit the CAN signal, which is received from any one of the plurality of vehicle modules, to at least one other of the plurality of vehicle modules. The gateway device may include: a communication interface provided with a plurality of channels capable of connecting to the plurality of vehicle modules; a switch unit configured to determine a connection state between the plurality of channels; and a controller configured to group a CAN signal, which is received from a first vehicle module connected to a first channel among the plurality of vehicle modules, into a message frame, and when an identifier of the message frame is included in a pre-determined high-speed transmission identifier group, configured to control the switch unit so that a second channel to which a second vehicle module corresponding to the identifier is connected, is connected to the first channel.

The switch unit may include a switch provided between the first channel and the second channel, and the controller may be further configured to turn on the switch when an identifier of the message frame is included in the high-speed transmission identifier group.

The controller may be further configured to turn on the switch so that the CAN signal may be transmitted to the second vehicle module from the first channel by directly passing the second channel.

The controller may be further configured to group a CAN signal received from the first vehicle module into the message frame after turning on the switch and may be configured to monitor the identifier of the message frame.

The controller may be further configured to turn off the switch when the identifier of the message frame is not included in the high-speed transmission identifier group.

The controller may be further configured to turn off the switch to prevent the CAN signal from being transmitted to the second vehicle module from the first channel by directly passing the second channel.

The communication interface may include a first channel capable of connecting to the first vehicle module including a diagnostic tool configured to diagnose the second vehicle module.

The controller may be further configured to control the switch unit so that the first channel is connected to the second channel when an identifier of the message frame is included in a high-speed transmission identifier group including at least one identifier configured to diagnose the second vehicle module.

Furthermore, in accordance with embodiments of the present disclosure, a control method of a vehicle provided with a gateway device connected to a plurality of vehicle modules and configured to transmit a CAN signal, which is received from any one of the plurality of vehicle modules, to at least one of the plurality of vehicle modules, the control method of the vehicle includes: receiving a CAN signal from a first vehicle module connected to a first channel of the gateway device; grouping the received CAN signal into a message frame; and connecting a second channel of the gateway device to which a second vehicle module corresponding to the identifier is connected, to the first channel when an identifier of the message frame is included in a pre-determined high-speed transmission identifier group.

The connecting of the second channel to the first channel may further include connecting the first channel to the second channel when the received CAN signal is grouped into a first message frame having an identifier included in the high-speed transmission identifier group.

The control method may further include transmitting the CAN signal to the second vehicle module from the first channel by directly passing the second channel.

The control method may further include grouping a CAN signal received from the first vehicle module into the message frame after turning on the switch, and monitoring the identifier of the message frame.

The control method may further include preventing the CAN signal received from the first vehicle module via the first channel from being transmitted to the second vehicle module by directly passing the second channel when the identifier of the message frame is not included in the high-speed transmission identifier group, as a result of monitoring.

The preventing the CAN from being transmitted to the second external device by directly passing the second channel may turn on the switch.

The receiving a CAN signal from the first vehicle module may receive the CAN signal from the first vehicle module including a diagnostic tool configured to diagnose the second vehicle module.

The connecting a second channel to the first channel may connect the first channel to the second channel when the identifier of the message frame is included in a high-speed transmission identifier group including at least one of identifiers configured to diagnose the second vehicle module.

BRIEF DESCRIPTION OF THE DRAWINGS

These and/or other aspects of the disclosure will become apparent and more readily appreciated from the following description of embodiments, taken in conjunction with the accompanying drawings of which:

FIGS. 6A and 6B are views illustrating a message frame in accordance with embodiments of the present disclosure;

FIG. 11 is a control flow chart illustrating a control method of a vehicle in accordance with embodiments of the present disclosure.

DETAILED DESCRIPTION OF THE EMBODIMENTS

Figure 1:
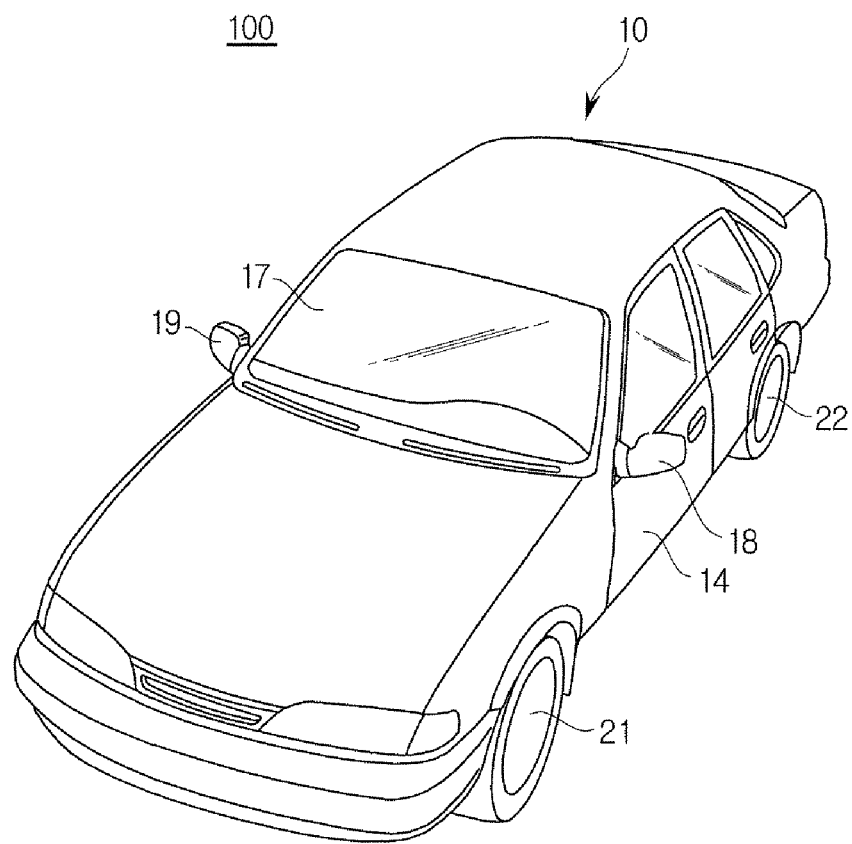
FIG. 1 is a view illustrating an exterior of a vehicle in accordance with embodiments of the present disclosure.

Reference will now be made in detail to embodiments of the present disclosure, examples of which are illustrated in the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Hereinafter a gateway device, a vehicle including the same, and a control method thereof will be described in detail with reference to drawings.

FIG. 1 is a view illustrating an exterior of a vehicle in accordance with embodiments of the present disclosure.

As illustrated in FIG. 1, a vehicle 100 according to embodiments may include a body 10 forming an exterior of the vehicle 100, a vehicle wheel 21 and 22 moving the vehicle 100, a door 14 closing the inside of the vehicle 100 from the outside, a front glass 17 providing a front view of the vehicle 100 to a driver inside the vehicle 100, and a side mirror 18 and 19 providing a view of a rear side of the vehicle 100 to the driver.

The vehicle wheel 21 and 22 may include a front wheel 21 provided on a front of the vehicle 100 and a rear wheel 22 provided on a rear of the vehicle 100, and the front wheel 21 and the rear wheel 22 may move the vehicle 100 forward or backward by receiving a torque from a driving device described later.

The door 14 may be rotatably provided on a right side and a left side of the body 10. When the door 14 is opened, a driver may be allowed to be seated in the vehicle 100, and when the door 14 is closed, the inside of the vehicle 100 may be closed from the outside.

The front glass 17 may be provided on an upper portion of the front of the body 10 to allow a driver inside the vehicle 100 to acquire visual information about the front of the vehicle 100 and may be referred to as "windshield glass."

The side mirror 18 and 19 may include a left side mirror 18 provided on the left side of the body 10 and a right side mirror 19 provided on the right side of the body 10. The side mirror 18 and 19 may allow a driver inside the vehicle 100 to acquire visual information of the lateral side and the rear side of the vehicle 100.

Figure 2:
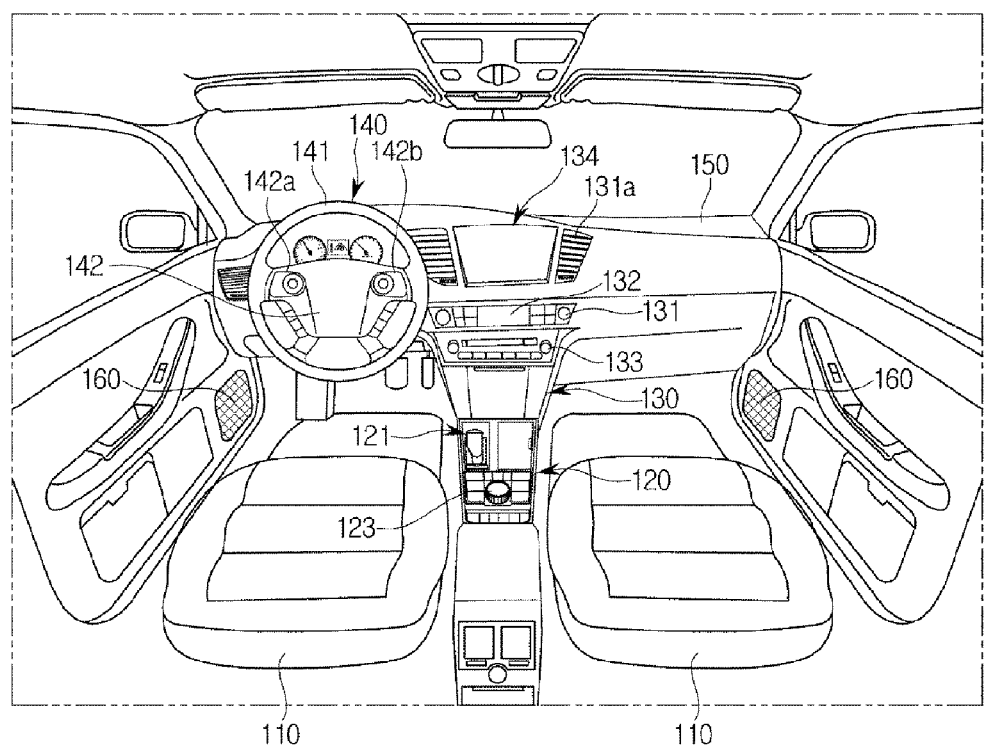
FIG. 2 is a view illustrating an internal configuration of a vehicle in accordance with embodiments of the present disclosure.

FIG. 2 is a view illustrating an inner configuration of a vehicle 100 in accordance with embodiments of the present disclosure.

As shown in FIG. 2, the vehicle 100 may include a seat 110 in which a driver or a passenger is seated, a dashboard 150 provided with a gear box 120, a center fascia (i.e., center console) 130, a steering wheel 140, and a speaker 160.

In the gear box 20, a gear lever 121 configured to change a speed of the vehicle 100, and a dial operation unit 122 configured to control an operation of functions of the vehicle 100 may be installed.

The steering wheel 140 provided on the dashboard 150 may be a device configured to adjust a driving direction of the vehicle 100, and may include a rim 141 held by the driver and a spoke 142 connected to a steering system of the vehicle 100 described later and configured to connect the rim 141 to a hub of a rotation shaft for the steering. According to embodiments, manipulation devices 142a and 142b may be formed in the spoke 142 to control various devices inside the vehicle 100, such as an audio device.

An air conditioning device 131, a clock 132, an audio device 133 and a display unit may be installed in the center fascia 130 provided on the dashboard 150. The air conditioning device 131 may keep an air inside the vehicle 100 in fresh by controlling a temperature, a moisture, an air cleanliness, and a flow of air of the inside of the vehicle 100. The air conditioning device 131 may include at least one discharging port 131a installed in the center fascia 130 to discharge air. A button or a dial may be installed in the center fascia 130 to control the air conditioning device 131. A user, such as a driver, may control the air conditioning device 131 by using a button disposed on the center fascia 130.

The clock 132 may be provided adjacent to a button or a dial which are configured to control the air conditioning device 131.

The audio device 133 may include an operation panel in which a number of buttons are provided to perform functions of the audio device 133. The audio device 133 may provide a radio mode configure to provide a radio function, and a media mode configured to play an audio file of various storage media in which the audio file is stored.

The display unit 134 may output information related to the vehicle 100 in an image or text type. For example, the display unit 134 may output a recommended travel route corresponding to an output signal through an image or text and inform the recommended travel route to a passenger when the vehicle 100 receives an output signal configured to control to output the recommended travel route. For this, the display unit 134 may be embedded in the center fascia 130. However, the installation of the display unit 134 is not limited thereto. The display unit 134 may be provided to be separated from the center fascia 130 of the vehicle 100. The display unit may be implemented by a Liquid Crystal Display (LCD), Light Emitting Diode (LED), Plasma Display Panel (PDP), Organic Light Emitting Diode (OLED), or Cathode Ray Tube (CRT), but is not limited thereto.

The dashboard 150 may further include various gauge boards indicating a driving speed of the vehicle 100 and the number of engine rotation or fuel gauge, and a globe box in which various things are stored.

The speaker 160 configured to output sound may be provided inside the vehicle 100. The speaker 160 may output information related to the vehicle 100 in sound. For example, the speaker 160 may output a recommended travel route corresponding to an output signal through an image or text and inform the recommended travel route to a passenger when the vehicle 100 receives an output signal configured to control to output the recommended travel route.

The vehicle 100 may include a plurality of vehicle modules, which is electrically controlled to perform a function directly or indirectly related to the driving. When each vehicle modules are electrically connected each other to communicate with the plurality of vehicle modules, a space and a weight occupied by a wiring in the vehicle may be increased and production cost may be increased. To relieve those difficulties, the vehicle may employ a Controller Area Network (CAN) to construct a communication network between the plurality of vehicle modules. The CAN may form a network though a serial bus to which a plurality of vehicle modules is connected, and may provide a seamless communication environment between the plurality of vehicle modules.

When the number of vehicle modules connected to the CAN constructed in the vehicle increases, the number of message frames transmitted via the bus may be increased, and thus, the distortion of the message frame and the communication delay may occur. Because a vehicle is an apparatus configured to secure safety as well as convenience, there is a need to provide fast and accurate communication environment. Therefore, the vehicle may include a gateway device 200 configured to receive a message frame from the plurality of vehicle modules, configured to analyze the message frame, and configured to transmit the message frame to a vehicle module corresponding to the result of the analysis.

Hereinafter the gateway device 200 used for CAN communication of the vehicle will be described.

Figure 3:
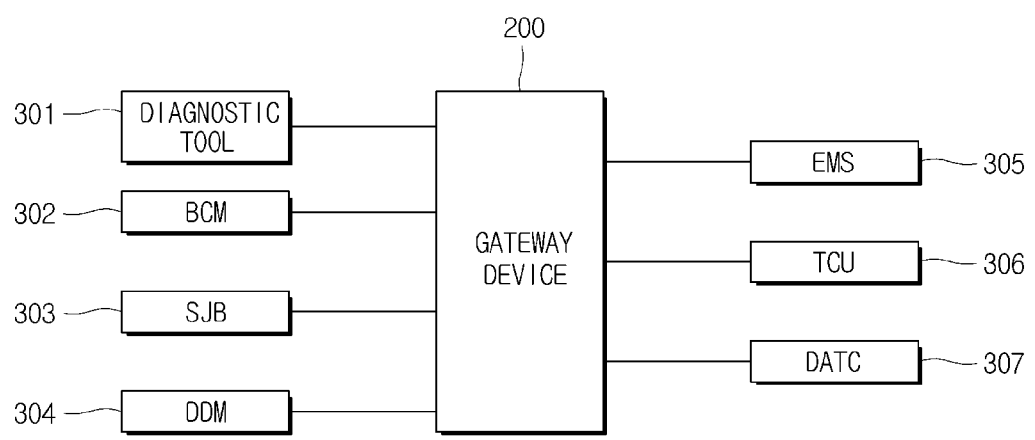
FIG. 3 is a control block diagram illustrating a vehicle in accordance with embodiments of the present disclosure.
Figure 4:
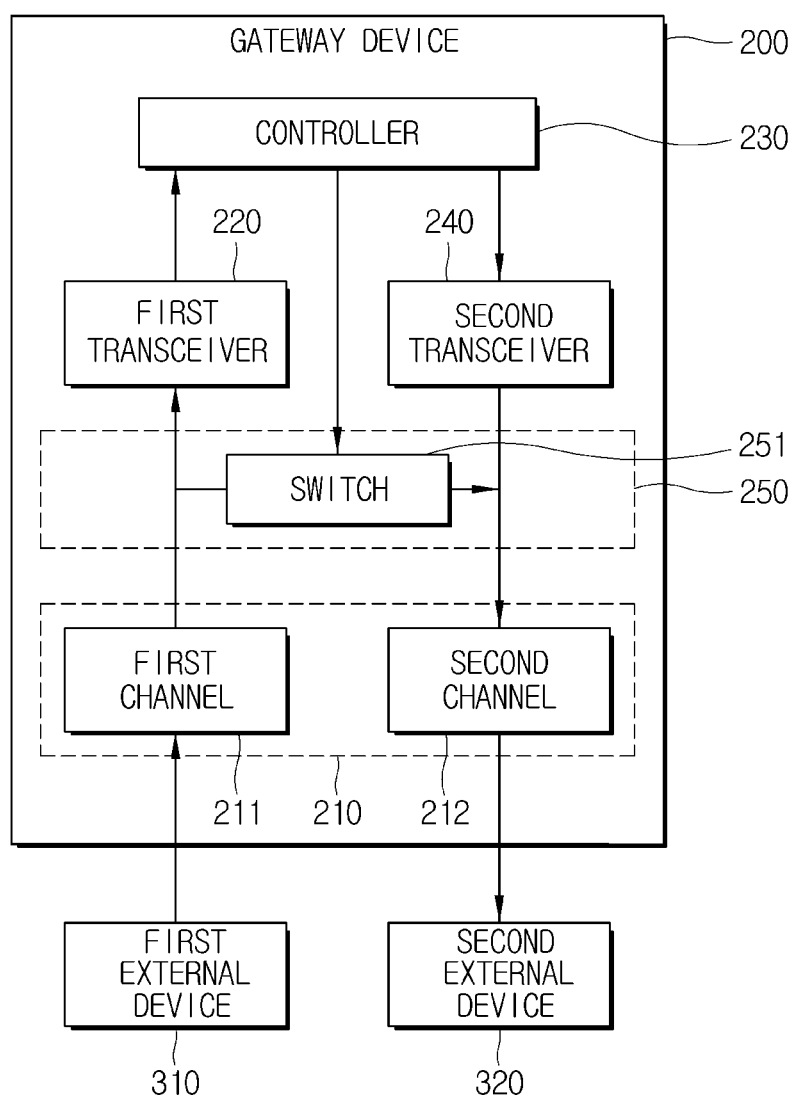
FIG. 4 is a control block diagram illustrating a gateway device in accordance with embodiments of the present disclosure.

FIG. 3 is a control block diagram illustrating a vehicle in accordance with embodiments of the present disclosure. FIG. 4 is a control block diagram illustrating a gateway device in accordance with embodiments of the present disclosure.

As mentioned above, a vehicle may employ the CAN communication method for communication between a plurality of vehicle modules. As shown in FIG. 3, the vehicle according to one embodiment may include a plurality of vehicle modules configured to transmit/receive a CAN signal and a gateway device 200 connected to the plurality of vehicle modules, and configured to transmit a CAN signal, which is received from any one of the plurality of vehicle modules, to at least one of the plurality of vehicle modules.

The plurality of vehicle modules may be installed inside or outside of the vehicle to provide at least one function performed by the vehicle, and may include an independent Electronic Control Unit (ECU), respectively.

As illustrated in FIG. 3, the vehicle modules installed in the vehicle may include a diagnostic tool 301, a Body Control Module (BCM) 302, a Smart Junction Box (SJB) 303; a Driver Door Module (DDM) 304, an Engine Management System (EMS) 305; a Transmission Control Unit (TCU) 306, and a Dual-Zone Automatic Temperature Controller (DATC) 307. However, since this is only an embodiment of the vehicle modules installed in the vehicle, the vehicle may further include a vehicle module other than those mentioned above, and the vehicle may include a part of the above mentioned embodiments.

Each vehicle module may transmit or receive a message frame, which is intended to be transferred, in the form of CAN signal that is an electrical signal. The vehicle may compose a network by using twisted pair wire. Thus, the CAN signal may include CAN_H signal and CAN_L signal which are transmitted in real-time via twisted pair wire. Therefore, the plurality of vehicle modules may transmit or receive a message frame through real time phase difference between twisted pair wire formed by the CAN_H signal, and CAN_L signal.

The gateway device 200 may transmit a CAN signal, which is received from any one of the plurality of vehicle modules, to at least one of the plurality of vehicle modules. What the gateway device 200 relays the CAN signal may be referred to as "routing".

As shown in FIG. 4, the gateway device 200 according to embodiments may include a communication interface 210 provided with a plurality of channels capable of connecting to an external device, a first transceiver 220 and a second transceiver 240 configured to convert a CAN signal received via the communication interface 210 into a reception signal in the form of digital signal, or configured to convert a transmission signal in the form of digital signal into the CAN signal, and a controller 230 configured to determine a vehicle module to be transmitted by grouping a reception signal into a message frame, and configured to generate a transmission signal transmitted to the determined vehicle module.

The communication interface 210 may form a transmission or reception path of the CAN signal by accessing to the external device. FIG. 4 illustrates the communication interface 210 provided with a first channel 211 connected to a first external device 310 and a second channel 212 connected to a second external device 320, but the communication interface 210 may be provided with more than three channels. In addition, an external device connected to a plurality of channels of the communication interface 210 may be at least one of the plurality of vehicle modules including the above mentioned diagnostic tool.

The first channel 211 and the second channel 212 may be implemented by a hardware terminal type capable of accessing to the first external device 310 or the second external device 320, respectively. The first channel 211 may receive a CAN signal from the first external device 310, and the second channel may transmit a CAN signal to the second external device 320. As mentioned above, the CAN signal may include CAN_H signal, and CAN_L signal transmitted via twisted pair wire.

The first transceiver 220 may receive a CAN signal from the first channel 211, and may convert the CAN signal into a reception signal in the form of digital signal. A description thereof will be described with reference to FIG. 5.

Figure 5:
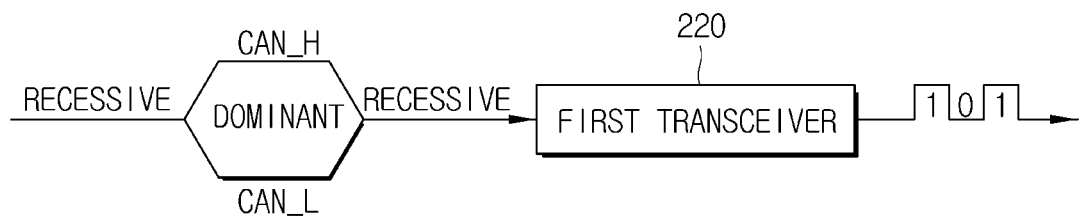
FIG. 5 is a view illustrating an operation of a first transceiver in accordance with embodiments of the present disclosure.

FIG. 5 is a view illustrating an operation of a first transceiver in accordance with embodiments of the present disclosure.

The first transceiver 220 may receive CAN_H signal, and CAN_L signal from the first channel 211 via twisted pair wire. Since the twisted pair wire has a phase, respectively through the CAN_H signal, and CAN_L signal, the first transceiver 220 may detect a phase difference formed in twisted wire. Therefore, the first transceiver 220 may output a reception signal in the form of digital signal corresponding to the phase difference formed in the twisted wire.

As shown in FIG. 5, the left signal of the first transceiver 220 transmitted to the first transceiver 220 may represent a CAN signal, and the right signal of the first transceiver 220 outputted from the first transceiver 220 may represent a reception signal. In the CAN communication, when a phase difference between twisted pair wire is less than a threshold, it may be defined as "recessive" and when a phase difference between twisted pair wire is larger than a threshold, it may be defined as "dominant". At this time, since the first transceiver 220 defines "recessive" as "logical one (1)" and "dominant" as "logical zero (0)" the first transceiver 220 may output a reception signal "101" in the FIG. 5.

As mentioned above, the first transceiver 220 may detect a phase difference of twisted wire in real time, and may output a reception signal in the form of bit stream.

Referring to FIG. 4 again, the controller 230 may receive a reception signal in the form of bit stream, and may route the reception signal to an appropriate external device. For this, the controller 230 may group a reception signal received in real time into a message frame, and then determine an external device to be transmitted through an identifier of a message frame. Hereinafter a message frame and an identifier will be described with reference to FIGS. 6A and 6B.

Figure 6B:
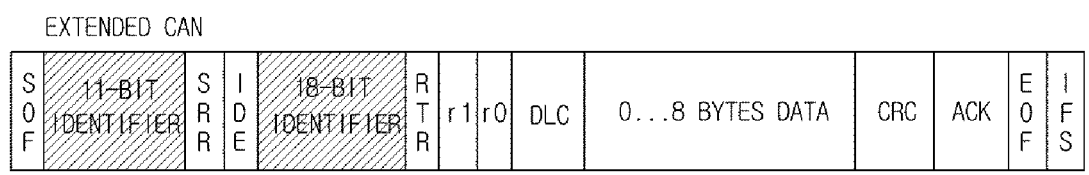

FIGS. 6A and 6B are views illustrating a message frame in accordance with embodiments of the present disclosure. FIG. 6A illustrates a message frame structure when following a standard CAN communication protocol, and FIG. 6B illustrates a message frame structure when following an extension CAN communication protocol.

Referring to FIG. 6A, a data frame according to one embodiment may include control field composed by Start Of Frame (SOF) representing a start of a message, identifier using to identify a message and to determine priority, Remote Transmission Request (RTR) using to distinguish between remote frame and data frame, Identifier Extension (IDE) using to distinguish between standard frame and extension frame, RO having a bit value, which is reserved for use future, and Data Length Code (DLC) representing the number of byte of data field, data field composed by 0-8 byte including data intended to be transmitted, Cyclil Redundancy Check (CRC) having a bit value to inform the end of the data field, Acknowledge (ACK) Field indicating whether to receive a message successfully, and End Of Frame (EOF) indicating the termination of the frame. In this case, the identifier of the data frame may be defined as 11 bits.

In contrast, a data frame may be configured as illustrated in FIG. 6B. In a data frame of FIG. 6B, an identifier may be divided into two by Substitute Remote Request (SRR) and IDE. The SRR may be used to intervene between standard data frame and extension data frame. In this case, an identifier of the data frame may be defined as 29 bits.

In addition to the embodiment described above, the data frame may be implemented in various ways within the technical concept including the identifier and data fields.

Referring to FIG. 4 again, the controller 230 may determine an external device corresponding to an identifier of a message frame after grouping a reception signal into a message frame. Herein determining an external device corresponding to an identifier may represent determining an external device to be transmitted a data field by confirming an external device generating a data field of a data frame. In FIG. 4, for convenience of description, an external device corresponding to an identifier of a data frame may be referred to as the second external device 320.

After determining the second external device 320, the controller 230 may output a transmission signal corresponding to the reception signal. When the first external device 310 and the second external device 320 have the same protocol, the controller 230 may output a reception signal as a transmission signal. Otherwise, when the first external device 310 and the second external device 320 have a different protocol, the controller 230 may output a result of converting a reception signal into the form to proper for a protocol of the second external device 320, as a transmission signal.

The second transceiver 240 may change a transmission signal output from the controller 230 into a CAN signal. Particularly, the second transceiver 240 may output a CAN signal corresponding the transmission signal by forming a phase difference in twisted pair wire. A method in which the second transceiver 240 changes a transmission signal into a CAN signal may be the same as the reverse of method in which the first transceiver 220 changes a CAN signal into a reception signal, and this a detail description will be omitted. In order to transmit changed transmission signal to the second external device 320, the second transceiver 240 may transmit the transmission signal to the second channel 212.

As mentioned above, to route a CAN signal generated from the first external device 310 to the second external device 320, the gateway device 200 may perform a process of converting a CAN signal into a data frame and confirming an identifier. As a result, a time delay between data frames may occur during routing the CAN signal. Hereinafter a description thereof will be described with reference to FIG. 7.

Figure 7:
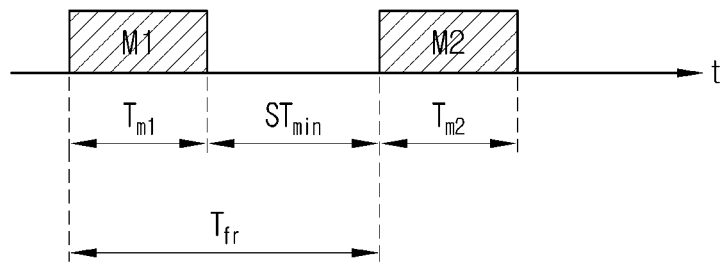
FIG. 7 is a view illustrating a time interval between data frames.

FIG. 7 is a view illustrating a time interval between data frames. In FIG. 7, a horizontal axis may represent a time axis, $M_1$ may represent a first data frame and $M_2$ may represent a second data frame.

As shown in FIG. 7, the gateway device 200 may need $T_{m1}$ to receive a CAN signal bit stream corresponding to the first data frame. In addition, the gateway device 200 may need $ST_{min}$ to group a received CAN signal into the first data frame, to confirm an identifier of the first data frame, and to determine the second external device 320. Therefore, the gateway device 200 may need $T_{fr}$ ($T_{m1}+ST_{min}$) to route a first message frame.

When a high-speed transmission of CAN signal as a diagnostic communication for the diagnosis of the external device is needed, the omission of message frame or the failure of diagnostic communication may occur due to a time delay generated in routing. Therefore, there may be a need to minimize a distance between data frames. For this, the gateway device 200 according to embodiments may further include a switch unit 250 determining a connection state between a plurality of channels. The switch unit 250 may include at least one switch installed for each two channels, and the at least one switch may determine whether of connection of two channels depending on ON-state/OFF-state.

In FIG. 3, the communication interface 210 may include the first channel 211 and the second channel 212 and thus the switch unit 250 may include a switch 251 disposed between the first channel 211 and the second channel 212.

The at least one switch of the switch unit 250 may be implemented by a transistor or Field Effect Transistor (FET). In addition, a switch may be converted into a ON-state or OFF state by the control of the controller 230, and a state conversion time may be configured to shorter than $ST_{min}$.

Hereinafter an operation of a switch controlled by the controller 230 will be described in detail with reference to FIGS. 8 to 10.

Figure 8:
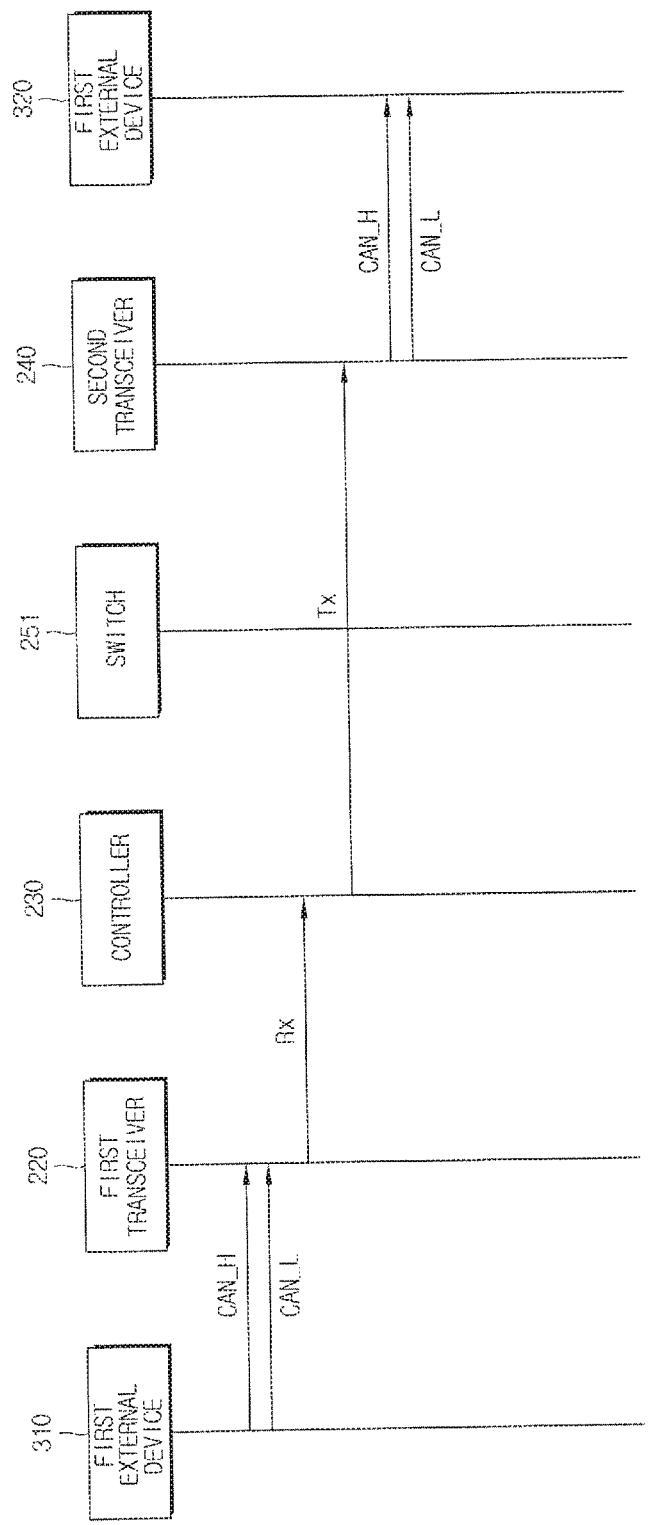
FIGS. 8 to 10 are linear algorithms illustrating a routing process of a gateway in accordance with embodiments of the present disclosure.
Figure 9:
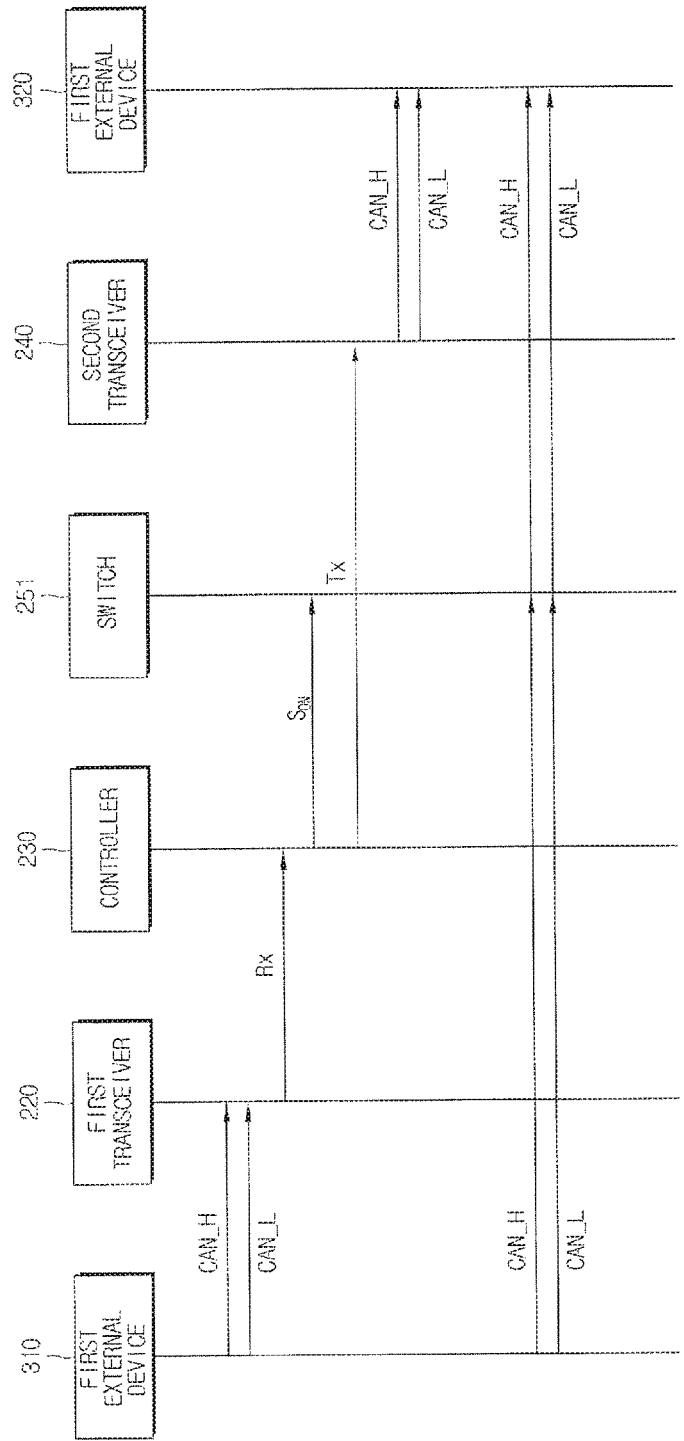
Figure 10:
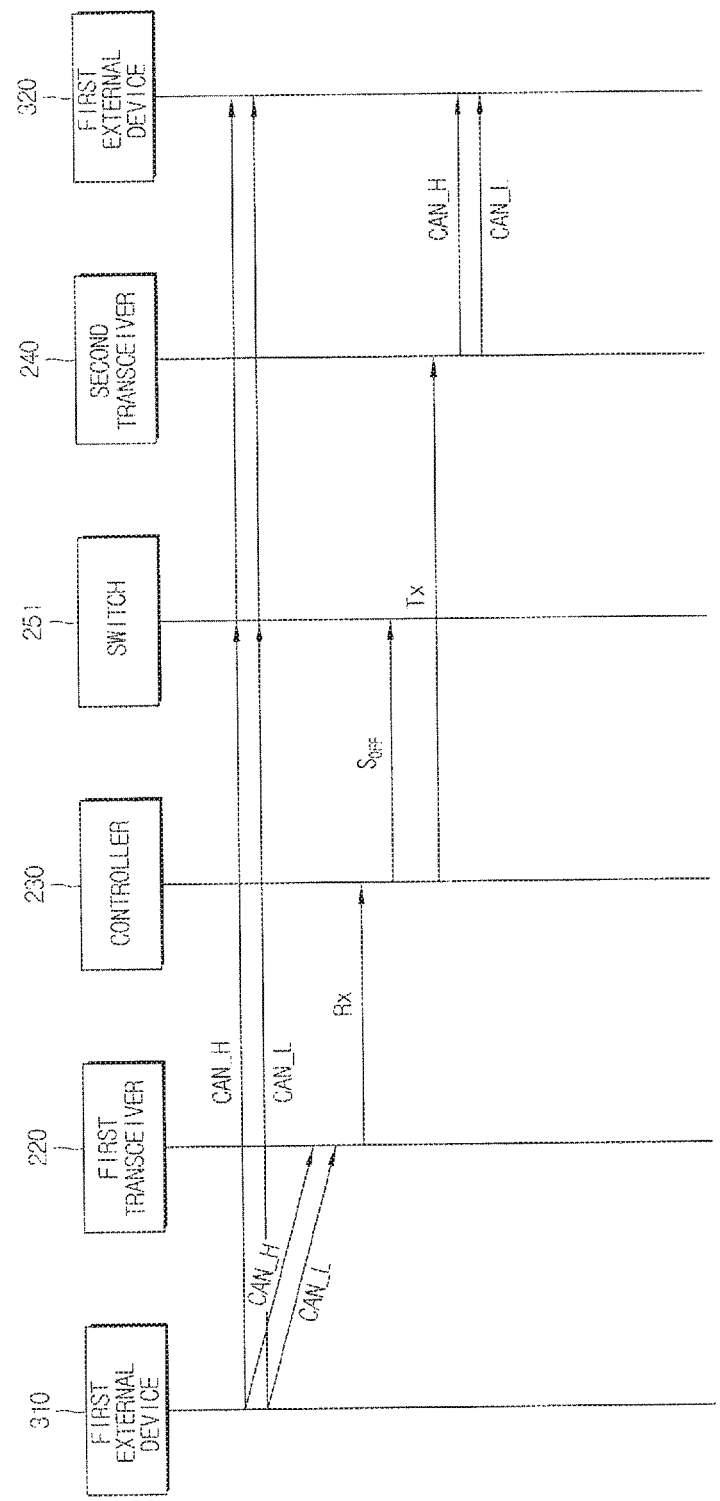

FIGS. 8 to 10 are linear algorithms illustrating a routing process of a gateway in accordance with embodiments of the present disclosure. In FIGS. 8 to 10, a vertical axis may represent a flow of time, and an arrow may represent a start point and an end point of the corresponding signal.

FIG. 8 illustrates a routing process by the gateway device 200 in a state in which high-speed transmission of CAN signal is not needed.

A CAN signal may be transmitted from the first external device 310 to the first transceiver 220 via the first channel 211. As mentioned above, the CAN signal may be composed by CAN_H signal and CAN_L signal, and thus the first transceiver 220 may receive CAN_H signal and CAN_L signal via twisted wire. The first transceiver 220 may receive CAN_H signal and CAN_L signal at the same time.

The first transceiver 220 may output a reception signal $R_X$ based on a phase difference of the twisted wire formed by the CAN_H signal and CAN_L signal. At this time, the first transceiver 220 may detect the phase difference of the twisted wire in real time, and then output the reception signal $R_X$ in the form of bit stream. The reception signal $R_X$ may be transmitted to the controller 230.

The controller 230 may group the reception signal $R_X$ in the form of bit stream into a data frame. In addition, the controller 230 may confirm an identifier in grouped data frame, and then determine the second external device 320 to be transmitted the corresponding data frame. After determining the second external device 320, the controller 230 may output a transmission signal $T_X$ corresponding to the reception signal $R_X$, and then transmit the transmission signal $T_X$ to the second transceiver 240. At this time, the output transmission signal $T_X$ may be the same form as the reception signal $R_X$, or may be the converted form to correspond to the protocol of the second external device 320.

The second transceiver 240 may convert the transmission signal $T_X$ received from the controller 230 into a CAN signal, and then may transmit the CAN signal to the second external device 320 via the second channel 212. Since the second transceiver 240 and the second external device 320 may be connected by the twisted wire, the second transceiver 240 may transmit the CAN signal composed by CAN_H signal and CAN_L signal to the second external device 320. The transceiver 240 may transmit CAN_H signal and CAN_L signal at the same time.

Unlike FIG. 8, FIG. 9 illustrates a routing process by the gateway device 200 in a state in which high-speed transmission of CAN signal is needed.

A CAN signal may be transmitted from the first external device 310 to the first transceiver 220 via the first channel 211. As mentioned above, the CAN signal may be composed by CAN_H signal and CAN_L signal, and thus the first transceiver 220 may receive CAN_H signal and CAN_L signal via twisted wire. The first transceiver 220 may receive CAN_H signal and CAN_L signal at the same time.

The first transceiver 220 may output a reception signal $R_X$ based on a phase difference of the twisted wire formed by the CAN_H signal and CAN_L signal. At this time, the first transceiver 220 may detect the phase difference of the twisted wire in real time, and then output the reception signal $R_X$ in the form of bit stream. The reception signal $R_X$ may be transmitted to the controller 230.

The controller 230 may group the reception signal $R_X$ in the form of bit stream into a data frame. In addition, the controller 230 may determine an identifier in a grouped data frame, and then determine the second external device 320 to be transmitted the corresponding data frame. Further, the controller 230 may determine whether the identifier of the data frame is included in a pre-determined high-speed transmission identifier group. Herein, the high-speed transmission identifier group may represent an identifier of a data frame in which a CAN signal is needed to be transmitted at a high-speed, and may be determined at production time or may be determined in advance according to an input by a user. The high-speed transmission identifier group may include at least one identifier among the identifiers of the data frame for the diagnosis of the second external device 320.

When an identifier of the data frame is included in the pre-determined high-speed transmission identifier group, the controller 230 may transmit a signal $S_{ON}$ configured to turn on the switch 251 to the switch 251 disposed between the first channel 211 and the second channel 212. The controller 230 may output a transmission signal $T_X$ corresponding to the reception signal $R_X$, and then transmit the transmission signal $T_X$ to the second transceiver 240. At this time, the output transmission signal $T_X$ may be the same form as the reception signal $R_X$, or may be the converted form to correspond to the protocol of the second external device 320.

The second transceiver 240 may convert the transmission signal $T_X$ received from the controller 230 into a CAN signal, and then may transmit the CAN signal to the second external device 320. Since the second transceiver 240 and the second external device 320 may be connected by the twisted wire, the second transceiver 240 may transmit the CAN signal composed by CAN_H signal and CAN_L signal to the second external device 320. The second transceiver 240 may transmit CAN_H signal and CAN_L signal at the same time. Again, when a CAN signal that is CAN_H signal and CAN_L signal is received from the first external device 310, the gateway device 200 may transmit the CAN signal to the second external device 320 from the first channel 211 by directly passing the switch 251 and via the second channel 212.

As mentioned above, the controller 230 may turn on the switch 251 so that a path, in which the CAN signal is directly transmitted to the second channel 212 from the first channel 211 without passing the controller 230, may be formed. As a result, since a time to confirm an identifier may be reduced after being grouped into a data frame, a CAN signal generated in the first external device 310 may be quickly transmitted to the second external device 320.

FIG. 10 illustrates a routing process by the gateway device 200 in a state in which a request of high-speed transmission of CAN signal is stopped. In FIG. 10, it may be assumed that the switch 251 is turned on.

As the same as FIG. 9, when an identifier of the data frame is included in the pre-determined high-speed transmission identifier group, the controller 230 may turn on the switch 251 configured to connect the first external device 310 to the second external device 320. As a result, a CAN signal may be directly transmitted to the second channel 212 from the first channel 211 without passing the controller 230.

Simultaneously, the controller 230 may monitor a CAN signal received from the first external device 310. Particularly, the first transceiver 220 may convert the CAN signal into a reception signal $R_X$, and transmit the reception signal $R_X$ to the controller 230, and the controller 230 may group the reception signal $R_X$ into a message frame, and then monitor an identifier of the message frame.

What an identifier of the data frame is not included in the pre-determined high-speed transmission identifier group may represent that high speed transmission is no longer needed. Therefore, the controller 230 may transmit a signal $S_{OFF}$ configured to turn off the switch 251 to the switch 251 disposed between the first channel 211 and the second channel 212. As a result, the CAN signal may be not transmitted to the second channel 212 from the first channel 211.

The controller 230 may output a transmission signal $T_X$ corresponding to the reception signal $R_X$, and then transmit the transmission signal $T_X$ to the second transceiver 240. The second transceiver 240 may convert the transmission signal $T_X$ received from the controller 230 into a CAN signal, and then may transmit the CAN signal to the second external device 320. The second transceiver 240 may transmit CAN_H signal and CAN_L signal at the same time.

Again, when a CAN signal that is CAN_H signal and CAN_L signal is received from the first external device 310, the gateway device 200 may not transmit the CAN signal to the second external device 320 from the first channel 211 by directly passing the switch 251 and via the second channel 212, but may transmit the CAN signal to the second external device 320 after a process of confirming an identifier by grouping the CAN signal by a data frame in the controller 230.

FIG. 11 is a control flow chart illustrating a control method of a vehicle in accordance with embodiments of the present disclosure.

The gateway device 200 may receive a CAN signal from the first external device 310. Particularly, the first channel 211 connected to the first external device 310 among the communication interface 210 of gateway may receive the CAN signal that is CAN_H signal and CAN_L signal. At this time, the first external device 310 may include the diagnostic tool 301 (S 500).

The gateway device 200 may group the received CAN signal into a message frame. Particularly, the first transceiver 220 of the gateway device 200 may convert the CAN signal into a reception signal in the form of bit stream, and the controller 230 of the gateway device 200 may group the reception signal into the message frame (S 510).

After grouping the CAN single into the message frame, the controller 230 of the gateway device 200 may determine an identifier of the message frame (S 520). When the identifier is confirmed, the controller 230 of the gateway device 200 may determine the second external device 320 corresponding to the confirmed identifier (S 530).

Further, the controller 230 may determine whether the identifier of the data frame is included in a pre-determined high-speed transmission identifier group (S540). Herein, the high-speed transmission identifier group may represent an identifier of a data frame in which a CAN signal is needed to be transmitted at a high-speed, and may be determined at production time or may be determined in advance according to an input by a user. The high-speed transmission identifier group may include at least one identifier among the identifiers of the data frame for the diagnosis of the second external device 320.

When an identifier of the data frame is not included in the pre-determined high-speed transmission identifier group, the process may be terminated. On the contrary, when an identifier of the data frame is included in the pre-determined high-speed transmission identifier group, the controller 230 of the gateway device 200 may turn on the switch 251 configured to connect the first channel 211 to which the first external device 310 is connected, to the second channel 212 to which the second external device 320 is connected (S 550).

As a result, after the switch 251 is turned on, the gateway device 200 may transmit the CAN signal received from the first external device 310 to the second external device 320 from the first channel 211 by passing the switch 251 and directly delivering to the second channel 212.

As is apparent from the above description, according to the proposed gateway device, the vehicle including the same, and the control method of the same, a vehicle communication may be performed without the omission of the message frame by minimizing an interval between the message frames.

Although certain embodiments of the present disclosure have been shown and described, it would be appreciated by those skilled in the art that changes may be made in these embodiments without departing from the principles and spirit of the disclosure, the scope of which is defined in the claims and their equivalents.

DESCRIPTION OF NUMERAL REFERENCE

100: vehicle
200: gateway device
210: communication interface
220: first transceiver
230: controller
240: second transceiver
250: switch unit
310: first external device
320: second external device

What is claimed is:

1. A gateway device comprising:
a communication interface provided with a plurality of channels capable of connecting to an external device;
a switch unit configured to determine a connection state between the plurality of channels; and
a controller configured to group a Controller Area Network (CAN) signal, which is received from a first external device connected to a first channel among the plurality of channels, into a message frame, and when an identifier of the message frame is included in a pre-determined high-speed transmission identifier group, configured to control the switch unit so that a second channel, to which a second external device corresponding to the identifier is connected, is connected to the first channel, wherein
the switch unit is further configured to connect the first channel to the second channel when the received CAN signal is grouped into a first message frame having an identifier included in the high-speed transmission identifier group, and
the switch unit is further configured to directly transmit a CAN signal, which is based on a second message frame after the first message frame, to the second external device from the first channel.

2. The gateway device of claim 1, wherein:
the switch unit includes a switch provided between the first channel and the second channel, and
the controller is further configured to turn on the switch when the identifier of the message frame is included in the high-speed transmission identifier group.

3. The gateway device of claim 2, wherein:
the controller is further configured to turn on the switch so that the CAN signal is transmitted to the second external device from the first channel by directly passing the second channel.

4. The gateway device of claim 2, wherein:
the controller is further configured to group a CAN signal received from the first external device into the message frame after turning on the switch and configured to monitor the identifier of the message frame.

5. The gateway device of claim 4, wherein:
the controller is further configured to turn off the switch when the identifier of the message frame is not included in the high-speed transmission identifier group.

6. The gateway device of claim 5, wherein:
the controller is further configured to turn off the switch to prevent the CAN signal from being transmitted to the second external device from the first channel by directly passing the second channel.

7. The gateway device of claim 1, wherein:
the communication interface includes a first channel capable of connecting to the first external device including a diagnostic tool configured to diagnose the second external device.

8. The gateway device of claim 7, wherein:
the controller is further configured to control the switch unit so that the first channel is connected to the second channel when the identifier of the message frame is included in a high-speed transmission identifier group including at least one identifier configured to diagnose the second external device.

9. The gateway device of claim 1, wherein:
the controller is further configured to control the switch unit so that the first channel is connected to the second channel when the received CAN signal is grouped into a first message frame having an identifier included in the high-speed transmission identifier group and configured to transmit the CAN signal based on the first message frame to the second external device via the second channel.

10. The gateway device of claim 9, wherein:
the controller is further configured to monitor an identifier of the second message frame and configured to control the switch unit based on a result of the monitoring.

11. A vehicle comprising:
a plurality of vehicle modules configured to transmit/receive a CAN signal; and
a gateway device connected to the plurality of vehicle modules and configured to transmit the CAN signal, which is received from any one of the plurality of vehicle modules, to at least one other of the plurality of vehicle modules, wherein the gateway device includes:
- a communication interface provided with a plurality of channels capable of connecting to the plurality of vehicle modules;
- a switch unit configured to determine a connection state between the plurality of channels; and
- a controller configured to group a CAN signal, which is received from a first vehicle module connected to a first channel among the plurality of vehicle modules, into a message frame, and when an identifier of the message frame is included in a pre-determined high-speed transmission identifier group, configured to control the switch unit so that a second channel, to which a second vehicle module corresponding to the identifier is connected, is connected to the first channel, the switch unit is further configured to connect the first channel to the second channel when the received CAN signal is grouped into a first message frame having an identifier included in the high-speed transmission identifier group, and the switch unit is further configured to directly transmit a CAN signal, which is based on a second message frame after the first message frame, to the second external device from the first channel.

12. The vehicle of claim 11, wherein:
the switch unit includes a switch provided between the first channel and the second channel, and
the controller is further configured to turn on the switch when the identifier of the message frame is included in the high-speed transmission identifier group.

13. The vehicle of claim 12, wherein:
the controller is further configured to turn on the switch so that the CAN signal is transmitted to the second vehicle module from the first channel by directly passing the second channel.

14. The vehicle of claim 12, wherein:
the controller is further configured to group a CAN signal received from the first vehicle module into the message frame after turning on the switch and configured to monitor the identifier of the message frame.

15. The vehicle of claim 14, wherein:
the controller is further configured to turn off the switch when the identifier of the message frame is not included in the high-speed transmission identifier group.

16. The vehicle of claim 15, wherein:
the controller is further configured to turn off the switch to prevent the CAN signal from being transmitted to the second vehicle module from the first channel by directly passing the second channel.

17. The vehicle of claim 11, wherein:
the communication interface includes a first channel capable of connecting to the first vehicle module including a diagnostic tool configured to diagnose the second vehicle module.

18. The vehicle of claim 17, wherein:
the controller is further configured to control the switch unit so that the first channel is connected to the second channel when the identifier of the message frame is included in a high-speed transmission identifier group including at least one identifier configured to diagnose the second vehicle module.

19. The vehicle of claim 11, wherein:
the controller is further configured to control the switch unit so that the first channel is connected to the second channel when the received CAN signal is grouped into a first message frame having an identifier included in the high-speed transmission identifier group and configured to transmit the CAN signal based on the first message frame to the second external device via the second channel.

20. The vehicle of claim 19, wherein:
the controller is further configured to monitor an identifier of the second message frame and configured to control the switch unit based on a result of the monitoring.

21. A control method of a vehicle provided with a gateway device connected to a plurality of vehicle modules and configured to transmit a CAN signal, which is received from any one of the plurality of vehicle modules, to at least one of the plurality of vehicle modules, comprising:
receiving a CAN signal from a first vehicle module connected to a first channel of the gateway device;
grouping the received CAN signal into a message frame;
connecting a second channel of the gateway device, to which a second vehicle module corresponding to the identifier is connected, to the first channel when an identifier of the message frame is included in a pre-determined high-speed transmission identifier group; and
transmitting a CAN signal, which is based on a second message frame after the first message frame, to the second external device from the first channel by directly passing the second channel.

22. The control method of claim 21, wherein the connecting of the second channel to the first channel further comprises:
connecting the first channel to the second channel when the received CAN signal is grouped into a first message frame having an identifier included in the high-speed transmission identifier group.

23. The control method of 21, further comprising:
controlling a connection between the first channel and the second channel by monitoring the identifier of the second message frame.

* * * * *